(12) United States Patent
Takaki

(10) Patent No.: US 9,753,130 B2
(45) Date of Patent: Sep. 5, 2017

(54) TARGET DETECTION APPARATUS

(71) Applicant: DENSO CORPORATION, Kariya, Aichi-pref. (JP)

(72) Inventor: Ryo Takaki, Okazaki (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 230 days.

(21) Appl. No.: 14/516,711

(22) Filed: Oct. 17, 2014

(65) Prior Publication Data

US 2015/0109164 A1    Apr. 23, 2015

(30) Foreign Application Priority Data

Oct. 17, 2013   (JP) ................................. 2013-216627

(51) Int. Cl.

| G01S 13/93 | (2006.01) |
|---|---|
| G01S 13/04 | (2006.01) |
| G01S 13/86 | (2006.01) |
| G01S 7/41 | (2006.01) |
| G01S 13/66 | (2006.01) |

(52) U.S. Cl.
CPC ............... *G01S 13/04* (2013.01); *G01S 7/41* (2013.01); *G01S 13/867* (2013.01); *G01S 13/931* (2013.01); *G01S 13/66* (2013.01)

(58) Field of Classification Search
CPC .................................. G01S 13/04; G01S 7/41
USPC ........................................................ 342/70
See application file for complete search history.

(56) References Cited

U.S. PATENT DOCUMENTS 5,471,214 A * 11/1995 Faibish ................. G01S 13/931
  342/54
6,492,935 B1 * 12/2002 Higuchi ................ G01S 13/931
  342/54

(Continued)

FOREIGN PATENT DOCUMENTS

| JP | 2001-099930 | 4/2001 |
| JP | 2007-232409 | 9/2007 |

(Continued)

OTHER PUBLICATIONS

Office Action dated Sep. 1, 2015 in corresponding Japanese Application No. 2013-216627 with English translation.

*Primary Examiner* — Marcus Windrich
(74) *Attorney, Agent, or Firm* — Harness, Dickey & Pierce, P.L.C.

(57) ABSTRACT

A target detection apparatus includes a first target detection section which detects a target which exists ahead of a vehicle and has a height sufficient to strike against the vehicle; a second target detection section which detects the target in an area different from an area in which the target is detected by the first target detection section, and a reliability degree setting section which sets a target reliability degree indicating probability that the target exists. When the target is detected only by the first target detection section or the second target detection section, and after the target is detected by both the first and the second target detection sections, the reliability setting section sets the target reliability degree based on an overlap detection time which is a period of time during which both the first and the second target detection sections continuously detect the target.

5 Claims, 3 Drawing Sheets

(56) References Cited

U.S. PATENT DOCUMENTS

| | | | | |
|---|---|---|---|---|
| 7,376,247 | B2* | 5/2008 | Ohta | G01C 3/08 |
| | | | | 342/46 |
| 7,825,849 | B2* | 11/2010 | Tsuchida | G01S 13/931 |
| | | | | 342/52 |
| 8,610,620 | B2* | 12/2013 | Katoh | G01S 13/931 |
| | | | | 342/52 |
| 8,766,816 | B2* | 7/2014 | Takatsudo | B60R 1/00 |
| | | | | 340/3.41 |
| 2003/0201929 | A1* | 10/2003 | Lutter | G01S 7/032 |
| | | | | 342/52 |
| 2004/0246167 | A1* | 12/2004 | Kumon | G01S 7/41 |
| | | | | 342/70 |
| 2005/0270225 | A1* | 12/2005 | Tokoro | G01S 7/4004 |
| | | | | 342/70 |
| 2007/0080850 | A1* | 4/2007 | Abe | G01S 13/931 |
| | | | | 342/52 |
| 2009/0251355 | A1* | 10/2009 | Nanami | G01S 13/931 |
| | | | | 342/27 |

FOREIGN PATENT DOCUMENTS

| | | |
|---|---|---|
| JP | 2008-008679 | 1/2008 |
| JP | 2008-008870 | 1/2008 |
| JP | 2011-123535 | 6/2011 |
| JP | 2012-141249 | 7/2012 |

\* cited by examiner

TARGET DETECTION APPARATUS

CROSS-REFERENCE TO RELATED APPLICATION

This application is based on and claims the benefit of priority from earlier Japanese Patent Application No. 2013-216627 filed Oct. 17, 2013, the description of which is incorporated herein by reference.

BACKGROUND

Technical Field

The present invention relates to a target detection apparatus which detects a target positioned ahead of a vehicle by using a plurality of sensors.

Related Art

Conventionally, a technique is known which is for detecting a target existing in the area around a vehicle (for example, refer to JP-A-2001-99930). According to this technique, data obtained from a plurality of sensors are combined to correct information which is poor for individual data, thereby calculating a precise position of the detected target.

The target detection apparatus disclosed in JP-A-2001-99930 detects a target by using a millimeter wave radar and an image sensor. Regarding the target existing in a predetermined area, information on the target is generated based on information obtained from both the sensors.

According to the technique disclosed in JP-A-2001-99930, when the target detected in an overlapping detection area of both the sensors deviate from the overlapping detection area, the detected target is tracked. When tracking the detected target, if the target has moved to an area where the target can be detected by only one of the sensors, the reliability degree of data of the sensor is temporarily lowered. This is because using one of the sensors may detect an object such as a road surface and a small object, which may have no height sufficient to strike against the own vehicle. Note that, hereinafter, a target represents an object having a height sufficient to strike against the vehicle.

However, in such a situation where a target has moved to an area where the target can be detected by only one of the sensors, it is not preferable that a target reliability degree indicating probability that a target exists is lowered. This is because, even though the control has to be performed whose part of conditions for performing the control (control performance conditions) is that the target reliability degree is higher, the control may not be performed.

For example, if a target, such as a pedestrian, exists in an area which is proximate to and ahead of the own vehicle and in which only one of the sensors can detect the target, the control which should be normally performed, such as automatic control, may not be performed.

SUMMARY

An embodiment provides a target detection apparatus which can prevent a target reliability degree from lowering in a situation in which a target probably exists, even when the target is detected in an area other than an overlapping detection area of a plurality of sensors.

As an aspect of the embodiment, a target detection apparatus includes: a first target detection section which detects a target which exists ahead of a vehicle and has a height sufficient to strike against the vehicle; a second target detection section which detects the target in an area different from an area in which the target is detected by the first target detection section; and a reliability degree setting section which sets a target reliability degree indicating probability that the target exists. When the target is detected only by the first target detection section or the second target detection section, and after the target is detected by both the first target detection section and the second target detection section, the reliability setting section sets the target reliability degree based on an overlap detection time which is a period of time during which both the first target detection section and the second target detection section continuously detect the target.

DETAILED DESCRIPTION OF THE PREFERRED EMBODIMENTS

With reference to the accompanying drawings, hereinafter are described target detection apparatuses, according to embodiments.

(First Embodiment)

Figure 1:
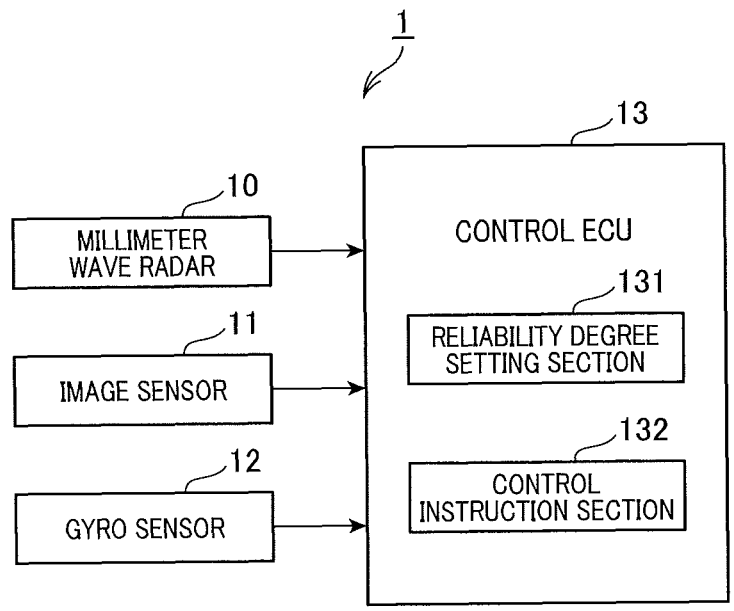
FIG. 1 is a block diagram of a target detection apparatus according to a first embodiment.

With reference to FIG. 1, a target detection apparatus 1 according to the first embodiment is described. The target detection apparatus 1 detects a target existing ahead of a vehicle, and is installed in the vehicle. FIG. 1 is a block diagram of the target detection apparatus 1. Hereinafter, the vehicle in which the target detection apparatus 1 is installed is referred to as "own vehicle".

As shown in FIG. 1, the target detection apparatus 1 includes a millimeter wave radar 10 (first target detection means, first target detection section), an image sensor 11 (second target detection means, second target detection section), a gyro sensor 12 (turn detection means, turn detection section), and a control ECU 13.

The millimeter wave radar 10 transmits millimeter waves forward of the own vehicle at regular intervals (e.g. 50 ms), and detects a target based on waves reflected from the target existing ahead of the own vehicle. A target detection area D1 (see FIG. 2) of the millimeter wave radar 10 is ahead of the own vehicle. The millimeter wave radar 10 is placed in the vicinity of a central portion of the front-end surface, for example, a bumper, of the own vehicle. The millimeter wave radar 10 is connected to the control ECU 13, and outputs detection data (hereinafter, referred to as "radar detection data") to the control ECU 13. By using the millimeter wave radar 10, it can be determined whether an object exists in the target detection area D1. However, the millimeter wave radar 10 does not detect the height of the object. Hence, when determining that an object exists by using only the radar detection data, the detected object may not be an object having a height sufficient to strike against the own vehicle, that is, a target, but may be a road surface or a small object such as a can. In other words, when using only the radar detection data, the target reliability degree indicating probability that a target exists is lower.

The image sensor 11 takes images of road conditions ahead of the own vehicle at regular intervals (e.g. 50 ms), and provides predetermined image processing such as edge detection to the images to detect a target. A target detection area D2 (see FIG. 2) of the image sensor 11 is ahead of the own vehicle. The image sensor 11 is placed at a central portion of the front in the interior of the own vehicle, for example, in the vicinity of the rearview mirror. The image sensor 11 is connected to the control ECU 13, and outputs image detection data to the control ECU 13.

The gyro sensor 12 detects the amount of turning of the own vehicle. The gyro sensor 12 is connected to the control ECU 13, and outputs turn data of the own vehicle to the control ECU 13.

The control ECU 13 is configured by a known microcomputer including a CPU, ROM, and RAM, which are not shown, and performs predetermined arithmetic processing according to a program stored in the ROM. In the arithmetic processing, various data inputted into the control ECU 13 are utilized.

For example, the control ECU 13 extracts the position and relative speed of an object from the radar detection data. In addition, the control ECU 13 extracts a target from the image detection data of the image sensor 11. The type of the extracted target is determined to decide whether it is a person or a vehicle. This determination is performed, for example, based on the aspect ratio of the extracted shape and the presence or absence of a predetermined characteristic shape included in the extracted portion. Then, the control ECU 13 generates fusion data from each piece of the extracted information, and detects a more precise position relation between the target and the own vehicle and the like. The radar detection data, the image detection data, and the fusion data are stored in the RAM as the past target information to continuously detect targets.

In addition, in the present embodiment, performing the arithmetic processing of the control ECU 13 functions as a reliability degree setting section 131 (reliability degree setting means) and a control instruction section 132 (control instruction means).

The reliability degree setting section 131 sets a target reliability degree based on the period of time during which a target is continuously detected by both the millimeter wave radar 10 and the image sensor 11. The control instruction section 132 makes a vehicle controller, which is not shown, perform predetermined vehicle control based on the target reliability degree set by the reliability setting section 131.

Figure 2:
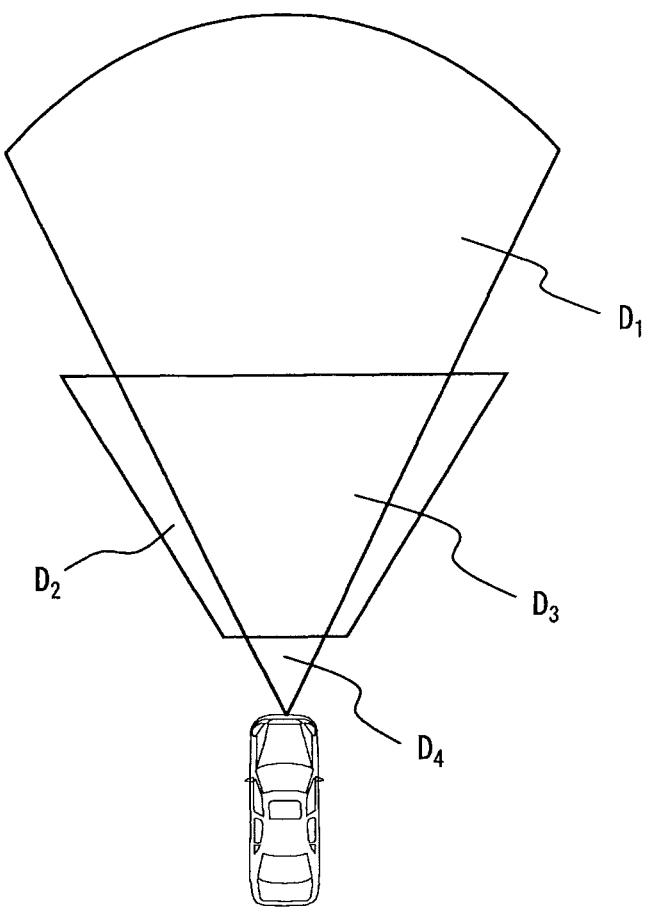
FIG. 2 is a schematic diagram showing target detection areas of a millimeter-wave radar and an image sensor.

Next, with reference to FIG. 2, the target detection areas of the millimeter wave radar 10 and the image sensor 11 are described. As shown in FIG. 2, although the target detection area D1 of the millimeter wave radar 10 has a narrow detection angle range in the horizontal plane, a target existing at a long distance (e.g. 100 m or more) can be detected in the target detection area D1 of the target detection area D1. In addition, since the millimeter wave radar 10 is mounted on the front-end surface of the vehicle, the area proximate to and ahead of the vehicle is also included in the target detection area D1.

Meanwhile, although the target detection area D2 of the image sensor 11 has a detection angle range wider than that of the millimeter wave radar 10, a detection limit distance of the image sensor 11 is shorter than that of the millimeter wave radar 10. In addition, since the image sensor 11 is installed in the interior of the own vehicle, the area ahead of and proximate to the own vehicle is a blind spot. Hence, the area ahead of and proximate to the own vehicle is not included in the target detection area D2.

A target detection area D3 is an area where the target detection area D1 of the millimeter wave radar 10 and the target detection area D2 of the image sensor 11 overlap. In addition, a target detection area D4 is an area proximate to and ahead of the own vehicle included in the target detection area of the millimeter wave radar 10. The target detection area D4 corresponds to a single target detection area.

Hereinafter, a target detection process is described which is performed by the control ECU 13 of the target detection apparatus 1 configured as described above, with reference to FIG. 3. The target detection process is repeatedly performed at regular intervals (e.g. 50 ms) from the time when an ignition key of the own vehicle is turned on to the time when the ignition key is turned off.

First, in S101, the control ECU 13 initializes stable recognition count values cnt. The stable recognition count values cnt are periods of time during which both the millimeter wave radar 10 and the image sensor 11 continue detecting a target. The stable recognition count value corresponds to an overlap detection time. In addition, the stable recognition count values cnt includes two types of count values, a count value obtained when the target is a person and a count value obtained when the target is a vehicle. In S101, the control ECU 13 initializes both the stable recognition count values cnt.

In S103 succeeding to S101, the control ECU 13 initializes the target reliability degree. As described above, the target reliability degree is an indicator indicating the probability that a target exists which is an object having a height sufficient to strike against the own vehicle. In the present embodiment, the target reliability degree is expressed by percentage. The highest target reliability degree is 100%.

Next, in S105, the control ECU 13 obtains a rotation angle of the own vehicle around the vertical axis from the previous cycle to the current cycle, that is, the amount of turning of the own vehicle from the previous cycle to the current cycle, from the gyro sensor 12.

In S107, the control ECU 13 determines whether or not a target ahead of the own vehicle has been detected based on the radar detection data inputted from the millimeter wave radar 10. In S107, if the control ECU 13 determines that a target has not been detected (S107: No), the process returns to S101.

Meanwhile, in S107, if the control ECU 13 determines that a target has been detected (S107: Yes), the control ECU 13 determines whether or not the target has been detected by both the millimeter wave radar 10 and image sensor 11, that is whether or not the target has detected by a fusion of the millimeter wave radar 10 and image sensor 11.

In S109, if the control ECU 13 determines that a target has detected by the fusion (S109: Yes), the control ECU 13 determines whether or not the type of the detected target is a person or a vehicle (S111). The type is determined by using the image detection data as described above.

In the succeeding S113, the control ECU 13 increments by one the stable recognition count value cnt corresponding to the type determined in S111, and sets the other stable recognition count value cnt to 0. Due to the step of S113, one of the stable recognition count values cnt is certainly 0. In the succeeding S115, the control ECU 13 increases the target reliability degree, and the process returns to the step of S105.

Meanwhile, in S109, if the control ECU 13 determines that the target has been detected not by the fusion (S109: No), the control ECU 13 determines whether or not the target has been detected in an overlapping target detection area of the millimeter wave radar 10 and image sensor 11, that is, in the target detection area D3 (S117).

In S117, if the control ECU 13 determines that the target has been detected in the target detection area D3 (S117: Yes), the control ECU 13 decrements by one both the stable recognition count values cnt (S119). If S117 is Yes, the millimeter wave radar 10 has detected the target, but the image sensor 11 has not detected the target. Hence, the control ECU 13 cannot determine whether the target detected by the millimeter wave radar 10 is a person or a vehicle. Therefore, the control ECU 13 decrements the stable recognition count value cnt, which is not 0. In S121 succeeding to S119, the control ECU 13 lowers the target reliability degree. Then, the process returns to the step of S105.

Figure 3:
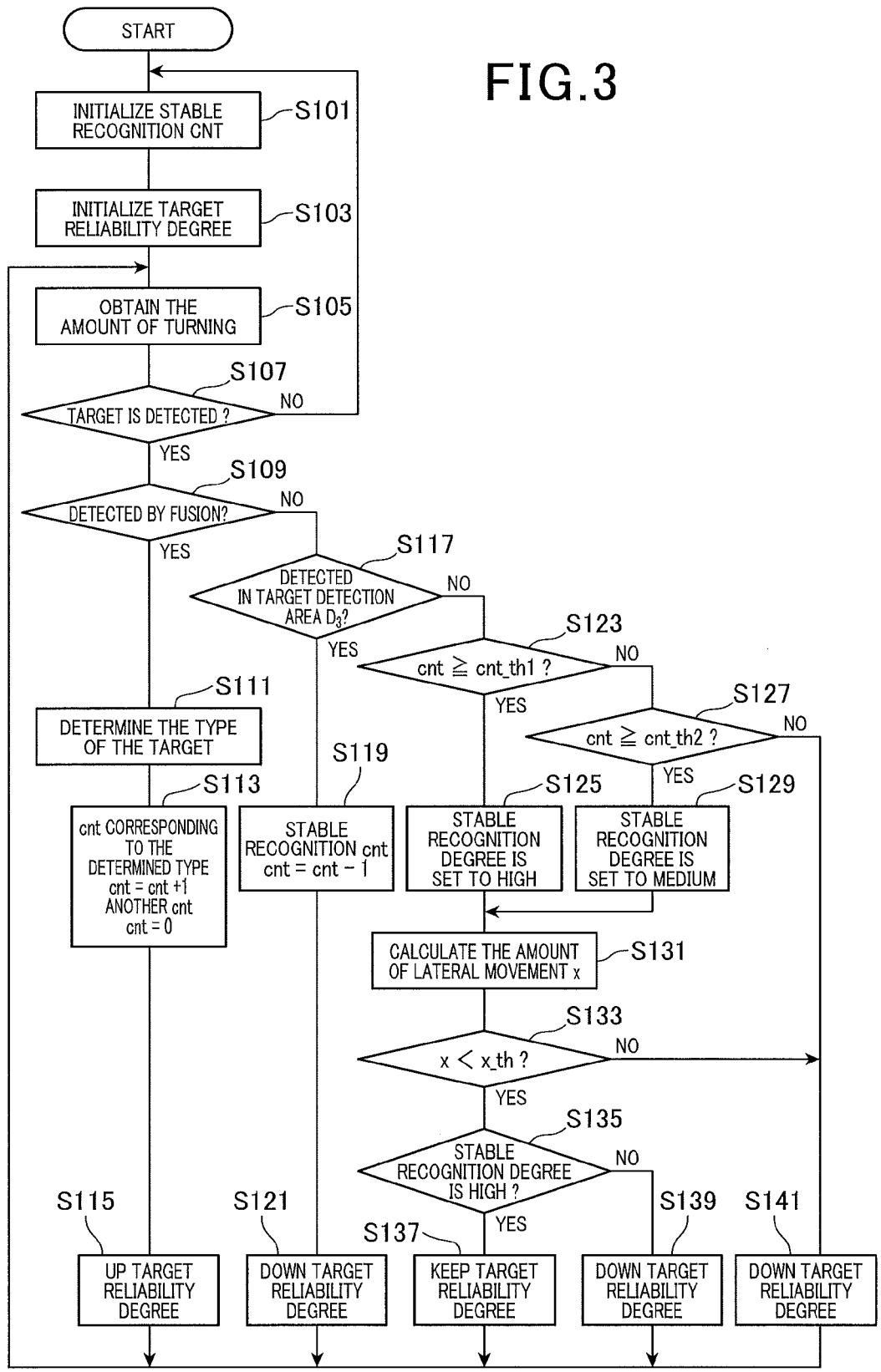
FIG. 3 is a flowchart of a target detection process performed by a control ECU of the first embodiment.

In step S117, if the control ECU 13 determines that the target has not been detected in the target detection area D3 (S117: No), the control ECU 13 determines whether or not the stable recognition count value cnt is equal to or more than a first predetermined count value cnt_th1, which corresponds to a threshold time (S123). The first predetermined count value cnt_th1 is previously set to, for example, 100. If the first predetermined count value cnt_th1 is 100, and the cycle of the target detection process shown in FIG. 3 is 50 ms, the threshold time is set to 5 sec.

The determination in S123 is performed for both the two types of stable recognition count values cnt. However, as described above, one of the two types of stable recognition count values cnt is always 0. Hence, if one of the two types of stable recognition count values cnt is equal to or more than the first predetermined count value cnt_th1, S123 is Yes. In addition, optionally, the determination in S123 may be performed only if the stable recognition count value cnt is not 0.

In S123, if the control ECU 13 determines that the stable recognition count value cnt is equal to or more than the first predetermined count value cnt_th1 (S123: Yes), a stable recognition degree is set to high (S125). If the type of the detected target is changed, the stable recognition count value cnt becomes 0 (S111). Hence, if the stable recognition count value cnt is larger, the period of time during which the type of the detected target is not changed is longer. Hence, the set stable recognition degree "high" indicates that the same type of target has been continuously detected.

In S123, if the control ECU 13 determines that the stable recognition count value cnt is less than the first predetermined count value cnt_th1 (S123: No), the control ECU 13 determines whether or not the stable recognition count value cnt is equal to or more than a second predetermined count value cnt_th2 (S127). Note that the second predetermined count value cnt_th2 also corresponds to the threshold time.

The second predetermined count value cnt_th2 is previously set to a value, for example, 60, smaller than the first predetermined count value cnt_th1. The second predetermined count value cnt_th2 of 60 corresponds to 3 sec.

In S127, if the control ECU 13 determines that the stable recognition count value cnt is equal to or more than the second predetermined count value cnt_th2 (S127: Yes), the stable recognition degree is set to medium (S129).

Note that the first predetermined count value cnt_th1 and the second predetermined count value cnt_th2 can be changed according to the speed of the own vehicle or the relative speed with respect to the target. For example, the predetermined count value cnt_th determined when the speed of the own vehicle is 80 km/h is set to be lower than the predetermined count value cnt_th determined when the speed of the own vehicle is 60 km/h.

Next, in S131, the control ECU 13 calculates the amount of lateral movement x of the target. The amount of lateral movement x is the amount of movement of the target in the width direction of the own vehicle. The amount of lateral movement x is calculated based on the difference between the lateral position of the target in the previous cycle and the lateral position of the target in the current cycle, which are detected by the millimeter wave radar 10, and the amount of turning of the own vehicle detected by the gyro sensor 12.

Specifically, first, in a coordinate system in the current cycle in which the own vehicle serves as a reference, the control ECU 13 determines the coordinate of the target based on the distance and the angle of the target detected in the current cycle. The control ECU 13 converts the determined coordinate to a coordinate in the coordinate system in the previous cycle in which the own vehicle serves as a reference, based on the amount of turning obtained in S105. The amount of lateral movement x is determined which is the difference between a horizontal axis component of the converted coordinate and a horizontal axis component of the coordinate of the target in the previous cycle in the coordinate system in which the own vehicle serves as a reference. Hence, the amount of lateral movement x, from which the influence of the amount of turning is eliminated, can be calculated.

Note that the amount of lateral movement x described above is calculated in a state where the lateral direction is determined with reference to the direction of the own vehicle in the previous cycle. Alternatively, the lateral direction may be determined with reference to the direction of the own vehicle in the current cycle. In this case, the coordinate of the target in the previous cycle is converted to a coordinate in a coordinate system in the current cycle in which the own vehicle serves as a reference. The amount of lateral movement x is calculated considering the amount of turning because, when the own vehicle turns, the target appears to have moved in the lateral direction even though the target has not moved in the lateral direction.

Next, in S133, the control ECU 13 determines whether or not the amount of lateral movement x of the target is less than a predetermined distance x_th. As the predetermined distance x_th, a distance by which the target can be determined to be moved in the lateral direction is previously set. For example, in the present embodiment, the predetermined distance x_th is set to 40 cm. Note that the predetermined distance x_th may be appropriately set according to traveling environment.

In S133, if the control ECU 13 determines that the amount of lateral movement x of the target is less than the predetermined distance x_th (S133: Yes), the control ECU 13 determines whether or not the stable recognition degree is high (S135).

In S135, if the control ECU 13 determines that the stable recognition degree is high (S135: Yes), the control ECU 13 keeps the target reliability degree, and the process returns to S105.

When S137 is performed, although the target is detected only by the millimeter wave radar 10, the stable recognition degree is high. The stable recognition degree of high indicates that the millimeter wave radar 10 has continuously detected the same type of target for a long period of time when the target exists in the target detection area D2 which is an overlapping detection area. Hence, even when the target is detected only by the millimeter wave radar 10, the possibility that the millimeter wave radar 10 has detected the same target is high. Since the same target is detected, an object such as a road surface and a small object, which are not assumed to be a target, is not detected. Hence, in the present embodiment, even when a target has detected only by the millimeter wave radar 10, the target reliability degree indicating the probability that a target exists is kept, if the stable recognition degree is high.

Meanwhile, in S135, if the control ECU 13 determines that the stable recognition degree is not high, that is, the stable recognition degree is medium (S135: Yes), the control ECU 13 lowers the target reliability degree (S139), and the process returns to S105. The range of lowering the target reliability degree in S139 is set to be smaller than that in S141 described below. This is because, even when the stable recognition degree is medium, it can be estimated that the probability is high that the millimeter wave radar 10 has continuously detected the same target, though the possibility is higher in the case where the stable recognition degree is high.

In addition, in S133, if the control ECU 13 determines that the amount of lateral movement x of the target is equal to or more than the predetermined distance x_th (S133: No), the control ECU 13 lowers the target reliability degree (S141), and the process returns to S105. The range of lowering the target reliability degree in S141 is larger than that in S139.

Hereinafter, the reason is described why the target reliability degree is significantly lowered in S141 if the result of the determination in S133 is No. A reflection level of millimeter waves has a feature that it is higher for a vehicle, and is lower for a pedestrian. Hence, if the target which is being detected is a pedestrian, when the pedestrian moves to the place in the vicinity of the vehicle, signal components of a reflected wave from the pedestrian overlap with signal components, whose intensity is higher, of a reflected wave from a vehicle. As a result, the reflected wave from the vehicle may be detected as the reflected wave from the pedestrian, which has been erroneously detected. In this case, the lateral position of the pedestrian, which is a target, shifts in the direction of the width of the vehicle, that is, in the lateral direction, equal to or more than the movement distance of the pedestrian. Hence, when the target moves in the lateral direction equal to more than the predetermined distance x_th, a target (vehicle) different from the target (pedestrian), which has been detected, may be erroneously detected.

If a target different from the target, which has been detected, is detected, taking over the reliability degree determined based on the target, which has been detected, is not proper. Hence, in S141, the target reliability degree is significantly lowered.

In addition, in S127, if the stable recognition count value is determined to be smaller than the second predetermined count value cnt_th2, S141 is performed to lower the target reliability degree. Hence, in the present embodiment, when the period of time is shorter during which the same type of target is continuously detected by the millimeter wave radar 10 and the image sensor 14, the target reliability degree is significantly lowered. Hence, when the target reliability degree is not higher in practice, vehicle control, in which a higher target reliability degree is part of conditions for performing control (control performance conditions), can be prevented from being unnecessarily performed because the target reliability degree is kept to a higher value.

Figure 4:
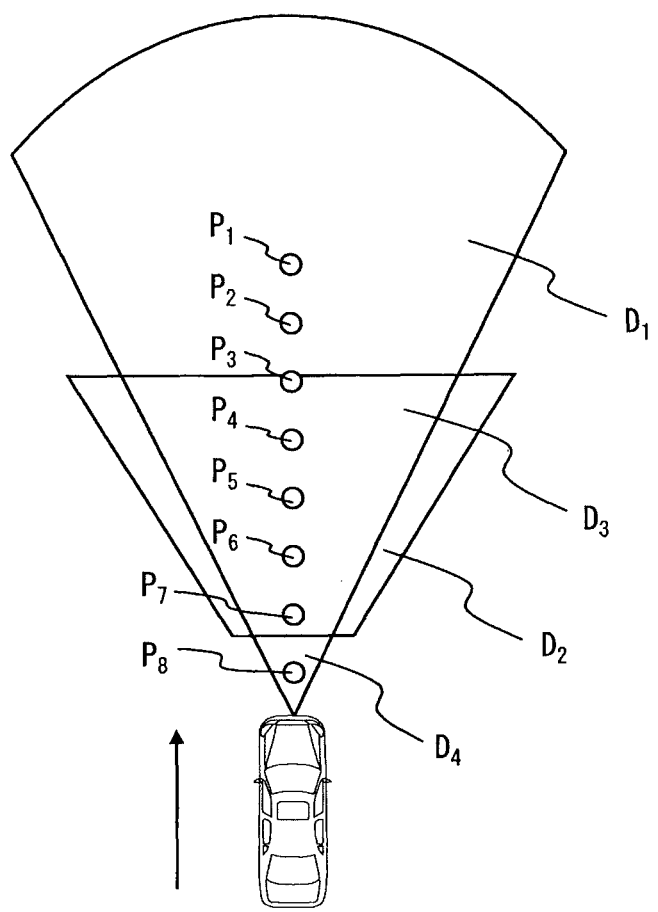
FIG. 4 is a diagram in which detection positions of a target are placed in a time sequence.

Next, variation of the target reliability degree is described in time series. FIG. 4 is a diagram showing one example of the target detection process described above. In FIG. 4, the target is a pedestrian. FIG. 4 is a schematic view showing a situation in which the own vehicle approaches the stationary target at a constant speed.

Specifically, FIG. 4 shows a situation in which the pedestrian existing ahead of the own vehicle is detected in the target detection area D1 of only the millimeter wave radar 10, next the pedestrian is detected in the target detection area D3 which is an overlapping target detection area, and then the pedestrian is detected in the target detection area D4 which is ahead of and proximate to the own vehicle.

The variation of the target reliability degree is described for each of the cycles. In the first cycle, a pedestrian P1 is detected in the target detection area D1. At this time, since the pedestrian P1 is detected only by the millimeter wave radar 10, the target reliability degree of the pedestrian P1 is 0%, which is the same as that in initialization (S141). When the position of the pedestrian is P2, the pedestrian is also in the target detection area D1. Hence, the target reliability degree remains 0%.

The pedestrian P3 is detected in the target detection area D3 by the millimeter wave radar 10 and the image sensor 11 (S109). Hence, the control ECU 13 increments the stable recognition count value cnt concerning a person by one (S113). In addition, the control ECU 13 sets the target reliability degree so as to be higher than that in the previous cycle (S115). Thereafter, although the position of the pedestrian shifts from P4 to P7, the pedestrian can also be detected by the millimeter wave radar 10 and the image sensor 11 at these positions. When the position of the pedestrian is P7, it is assumed that the stable recognition count value has become 100.

The pedestrian Ps is detected in the target detection area D4 in which only the millimeter wave radar 10 can perform detection. At this time, since the stable recognition count value has reached 100, S123 is Yes, and the stable recognition degree becomes high (S125). Although the pedestrian Ps is detected only by the millimeter wave radar 10, the stable recognition degree is high. Hence, the target reliability degree increased between the position P3 and the position of P7 is kept (S137).

In the present embodiment, the target reliability degree set in the target detection process shown in FIG. 3 is utilized in collision mitigation control, which is vehicle control for mitigating a collision with a target. In the collision mitigation control, a brake serving as the vehicle controller, a braking controller controlling the brake, and the like are used. In the present embodiment, a target is detected. If the target reliability degree of the target is equal to or more than a predetermined control performance reference value, it is determined whether or not control for mitigating a collision with the target is performed. That is, the fact that the target reliability degree is equal to or more than the predetermined control performance reference value is part of conditions for performing the collision mitigation control (control performance conditions of collision mitigation control). Note that the fact that the target reliability degree is equal to or more than the predetermined control performance reference value corresponds to meeting the conditions for performing the collision mitigation control.

The determination whether or not the control for mitigating a collision with a target is performed based on, for example, collision prediction time. Since the determination method is well-known, the explanation thereof is omitted.

Note that, to calculate the collision prediction time, positions of the target and the own vehicle are required. If the target is detected in the target detection area D4 which is an area proximate to and ahead of the own vehicle, the collision prediction time is shortened. Hence, if the target is detected in the target detection area D4, the possibility that the conditions for performing the collision mitigation control are met is higher.

If the control instruction section 132 of the control ECU 13 determines performing the collision mitigation control, the control instruction section 132 issues, for example, an instruction for controlling the brake to perform vehicle braking.

Finally, advantages of the present embodiment are described. According to the present embodiment, if the target which has been detected by the fusion can be detected only by the millimeter wave radar 10 (S109: No), the target reliability degree is set based on the period of time during which the target has continuously been detected by the fusion, that is, the stable recognition count value cnt.

Specifically, if the target has been continuously detected by the fusion for a long time, the stable recognition count value cnt becomes larger. In addition, even if the target can be detected only by the millimeter wave radar 10, and if the stable recognition count value cnt is a larger value, which is equal to or more than the first predetermined count value cnt_th1 (S123: Yes), the target reliability degree is kept which is that in the case where the target is detected by the fusion (S137).

Hence, even when the target, which has been detected, can be detected only by the millimeter wave radar 10, the detected target can be recognized as a target to be prevented from a collision.

In addition, the target detection apparatus 1 calculates the amount of lateral movement x of the target, based on the difference between the lateral position of the target in the previous cycle and the lateral position of the target in the current cycle, which are detected by the millimeter wave radar 10, and the amount of turning detected by the gyro sensor 12. Accordingly, since the amount of lateral movement x of the target is calculated considering the amount of turning of the own vehicle, false recognition can be prevented such that the target appears to have moved in the lateral direction due to the turn of the own vehicle. Then, if the amount of lateral movement x of the target is equal to or more than the predetermined distance x_th, the target reliability degree is lowered. Hence, in a situation in which another target may be detected, the target reliability degree set based on the target which has been previously detected can be prevented from being taken over. As a result, since the reliability of the target reliability degree improves, the vehicle control, whose part of conditions for performing the control (control performance conditions) is that the target reliability degree is higher, can also be prevented from being unnecessarily performed.

It will be appreciated that the present invention is not limited to the configurations described above, but any and all modifications, variations or equivalents, which may occur to those who are skilled in the art, should be considered to fall within the scope of the present invention.

(Modification 1)

In the first embodiment, as a combination of two sensors detecting a target, the usage of the millimeter wave radar 10 and the image sensor 11 is described. However, another combination can be utilized if target detection areas of two sensors are different from each other. For example, instead of the millimeter wave radar, a laser radar or an infrared radar may be used.

(Modification 2)

In the first embodiment, if S135 is Yes, in S137, the target reliability degree is kept. However, is S137, the target reliability degree may be lowered by a range which is lower than that in S139 or the same as that in S139.

(Modification 3)

In the first embodiment, the gyro sensor 12 is provided as the turn detection means. However, a yaw rate sensor or a steering angle sensor may be used as the turn detection means. Alternatively, the amount of turning may be detected by the combination of the yaw rate sensor and the steering angle sensor.

(Modification 4)

In the first embodiment, the stable recognition degree is set to three stages, that is, high, medium, and another state. However, the stable recognition degree may be set to four or more stages. When the stable recognition degree is set to four or more stages, predetermined count values having different magnitudes are set so as to correspond to the plurality of the stable recognition degrees. In addition, regarding the range of lowering the reliability degree, as the stable recognition degree is higher, that is, as the number of the predetermined count values equal to or less than the stable recognition count value cnt is increased (larger), the amount of reduction in the target reliability degree is decreased.

(Modification 5)

The target reliability degree described in the first embodiment increases when a target is detected by both the millimeter wave radar 10 and the image sensor 11. Alternatively, the target reliability degree may be calculated which is increased or decreased when a target is detected only by a first target detection means such as the millimeter wave radar 10. For example, if a target has been continuously detected for a period equal to or more than 3 sec. by the first target detection means, the target reliability degree is increased in each cycle of updating the sensor. In this case, the final target reliability degree is determined considering two target reliability degrees. For example, finally, the higher of the two target reliability degrees may be determined as the final target reliability, or conversely, the lower of the two target reliability degrees may be determined as the final target reliability. Alternatively, the average of the two target reliability degrees may be determined as the final target reliability.

(Modification 6)

The ranges of increasing and decreasing the stable recognition count value cnt is not required to be limited to +1 and −1, respectively, but may be changed depending on the speed of the vehicle, the relative speed between the own vehicle and the target, detection areas, the continuous detection number or the like.

Hereinafter, aspects of the above-described embodiments will be summarized.

As an aspect of the embodiment, a target detection apparatus includes: a first target detection section (10) which detects a target which exists ahead of a vehicle and has a height sufficient to strike against the vehicle; a second target detection section (11) which detects the target in an area different from an area in which the target is detected by the first target detection section; and a reliability degree setting section (13) which sets a target reliability degree indicating probability that the target exists. When the target is detected only by the first target detection section or the second target detection section, and after the target is detected by both the first target detection section and the second target detection section, the reliability setting section sets the target reliability degree based on an overlap detection time which is a period of time during which both the first target detection section and the second target detection section continuously detect the target.

When a target is detected by both the first target detection section and the second target detection section, the possibility that the target exists is higher. When a target is continuously detected by both the first target detection section and the second target detection section, the possibility that the target exists is especially higher. Hence, even when a target is detected only by the first target detection section or the second target detection section, after the target has been continuously detected by both the first target detection section and the second target detection section, the possibility is high that the target detected only by the first target detection section or the second target detection section is the target detected by both the first target detection section and the second target detection section.

Hence, even when a target is detected only by the first target detection section or the second target detection section, after the target has been detected by both the first target detection section and the second target detection section, a target reliability degree is set based on a period of time during which the target is continuously detected by both the first target detection section and the second target detection section. Accordingly, even if a target can be detected by only one of the target detection sections, the target reliability degree can be kept higher as in the case of detecting the target by both the target detection sections, depending on the length of the period of time during which the target has continuously detected by both the target detection sections.

What is claimed is:

1. A target detection apparatus, comprising:
   a first target detection section which detects an object which exists ahead of a vehicle in a first detection area;
   a second target detection section which detects a target in a second detection area, the second detection area being different from and overlapping with the first detection area, the second detection area having an overlapping detection area that overlaps with the first detection area; and
   a reliability degree setting section which sets a target reliability degree indicating a probability that the target exists and has a height sufficient to strike against the vehicle, wherein
   the reliability degree setting section updates the target reliability degree from an initial target reliability degree every time the first target detection section detects the object,
   when the object is detected by the first target detection section and the target is not detected by the second target detection section, if the object is in the overlapping detection area, the reliability degree setting section lowers the target reliability degree,
   when the object is detected by the first target detection section and the target is not detected by the second target detection section, and when the object is not in the overlapping detection area, if a stable recognition count value, which is incremented when the object is detected by the first target detection section and when the target is detected by the second target detection section and which is not changed or is decremented when the object is detected by the first target detection section and the target is not detected by the second target detection section, is less than at least one threshold value, the reliability degree setting section lowers the target reliability degree by a predetermined value, and
   when the object is detected by the first target detection section and the target is not detected by the second target detection section, and when the object is not in the overlapping detection area, if the stable recognition count value is equal to or more than the threshold value, the reliability degree setting section keeps the target reliability degree, or lowers the target reliability degree by a range smaller than a range set when the stable recognition count value is less than the threshold value.

2. The target detection apparatus according to claim 1, wherein
   the reliability degree setting section includes the plurality of threshold values different from each other, and decreases the amount of reduction in the target reliability degree, as the number of the threshold values equal to or less than the stable recognition count value increases.

3. The target detection apparatus according to claim 1, wherein
   when the object is detected by the first target detection section and the target is not detected by the second target detection section, the reliability degree setting section calculates the amount of lateral movement of the object based on a lateral position of the object detected by the first target detection section, and
   when the object is detected by the first target detection section and the target is not detected by the second target detection section, if the amount of lateral movement is equal to or more than a predetermined distance, the reliability degree setting section lowers the target reliability degree by the same range as a range set when the stable recognition count value is less than the threshold value, even if the stable recognition count value is equal to or more than the threshold value.

4. The target detection apparatus according to claim 3, further comprising a gyro sensor which detects the amount of turning of the vehicle, wherein
   the reliability degree setting section calculates the amount of lateral movement from which influence of the amount of turning of the vehicle is eliminated, based on the lateral position and the amount of turning detected by the gyro sensor, and determines whether or not the amount of lateral movement is equal to or more than a predetermined distance.

5. The target detection apparatus according to claim 1, further comprising a control instruction section which determines whether or not to make a predetermined vehicle controller perform vehicle control to mitigate a collision with the target based on the fact that the first target detection section has detected the object in a single target detection area, which is proximate to and ahead of the vehicle and is the area of the first target detection section but is not the area of the second target detection section, and the fact that the target reliability is equal to or more than a predetermined control performance reference value.

* * * * *